United States Patent
Christensen

(10) Patent No.: US 7,219,915 B2
(45) Date of Patent: May 22, 2007

(54) TRAILER BALL RAISING AND LOWERING APPARATUS

(76) Inventor: Craig A. Christensen, 3160 N. Township Rd., Yuba City, CA (US) 95993

( * ) Notice: Subject to any disclaimer, the term of this patent is extended or adjusted under 35 U.S.C. 154(b) by 74 days.

(21) Appl. No.: 11/078,978

(22) Filed: Mar. 12, 2005

(65) Prior Publication Data

US 2005/0206127 A1    Sep. 22, 2005

Related U.S. Application Data

(60) Provisional application No. 60/552,888, filed on Mar. 15, 2004.

(51) Int. Cl.
*B60D 1/46* (2006.01)
*B60D 1/44* (2006.01)

(52) U.S. Cl. ............................. 280/490.1; 280/491.1; 280/491.5

(58) Field of Classification Search ............. 280/490.1, 280/491.1, 491.5
See application file for complete search history.

(56) References Cited

U.S. PATENT DOCUMENTS

| | | | |
|---|---|---|---|
| 2,817,537 A | 12/1957 | Atkinson | |
| 2,847,232 A * | 8/1958 | Graham | 280/490.1 |
| 3,692,330 A * | 9/1972 | Kendall | 280/402 |
| 3,918,744 A * | 11/1975 | Gay | 280/418.1 |
| 3,944,259 A | 3/1976 | Miller | |
| 4,564,209 A * | 1/1986 | Kingsley et al. | 280/468 |
| 5,975,553 A * | 11/1999 | Van Vleet | 280/483 |
| 6,003,892 A | 12/1999 | Henson | |
| 6,129,371 A * | 10/2000 | Powell | 280/461.1 |
| 6,575,488 B2 | 6/2003 | Massey | |
| 6,663,133 B1 * | 12/2003 | Rosenlund | 280/490.1 |
| 6,726,237 B1 * | 4/2004 | Carrico | 280/490.1 |
| 6,932,375 B2 * | 8/2005 | Zahn | 280/482 |
| 2001/0038191 A1 * | 11/2001 | Massey | 280/490.1 |
| 2003/0184048 A1 * | 10/2003 | Bonde | 280/491.5 |
| 2004/0032112 A1 * | 2/2004 | Reese et al. | 280/477 |
| 2004/0155430 A1 * | 8/2004 | Zahn | 280/416.1 |

* cited by examiner

*Primary Examiner*—Lesley D. Morris
*Assistant Examiner*—Marlon Arce-Diaz

(57) ABSTRACT

A trailer ball raising and lowering apparatus includes vehicle attachment means, a first hitch-support unit connected to the vehicle attachment means, a raisable and lowerable second hitch-support unit, continuously movable first-to-second connector means connected between the first hitch-support unit and the raisable and lowerable second hitch-support unit, unit-to-unit lock means for locking the raisable and lowerable second hitch-support unit to the first hitch-support unit, and a hitch member connected to the raisable and lowerable second hitch-support unit. An important feature of the present invention is that the interconnection between a trailer-mounted ball connector and a hitch ball unit on the motor vehicle is not disconnected during raising and lowering of the respective ends of the trailer.

4 Claims, 5 Drawing Sheets

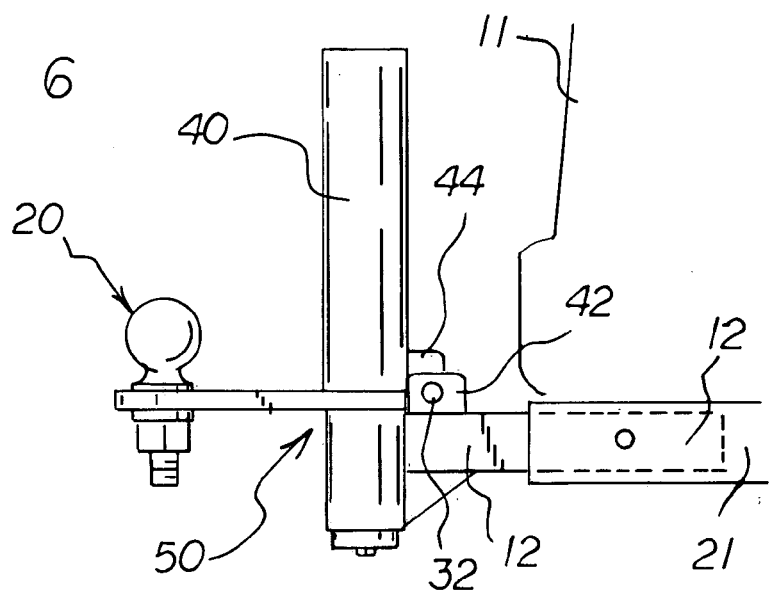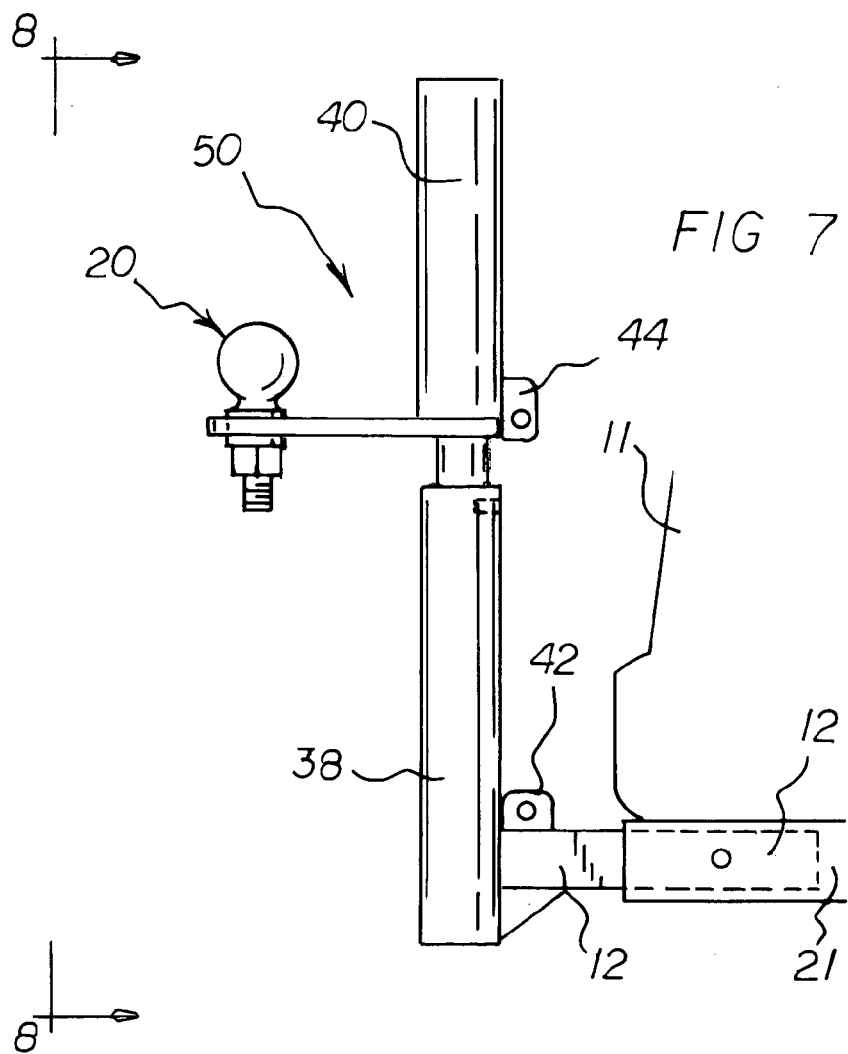

US 7,219,915 B2

TRAILER BALL RAISING AND LOWERING APPARATUS

CROSS-REFERENCE TO RELATED APPLICATION

This application claims priority based upon my copending Provisional Application Ser. No. 60/552,888; Mar. 15, 2004.

BACKGROUND OF THE INVENTION

1. Field of the Invention

The present invention relates generally to an interconnection between a pulling motor vehicle and a trailer, and, more particularly, to the interconnection between the pulling motor vehicle and a trailer wherein a trailer-mounted ball connector is provided on the trailer and a hitch ball unit is provided on the pulling motor vehicle.

2. Description of the Prior Art

Trailers are well known in the art. More specifically, trailers that carry other vehicles and that are pulled by a motor vehicle are well known. Even more specifically, trailers that carry other vehicles are often tilted to allow the carried vehicles to be loaded onto and unloaded from the trailer. Vehicles carried by such trailers include land vehicles and watercraft such as boats. A trailer carrying watercraft is often referred to as a boat trailer.

For trailers that carry other vehicles and that are tilted to allow the carried vehicles to be loaded onto and unloaded from the trailer, it is desirable to maintain the interconnection between the trailer and the pulling vehicle even as the trailer is tilted up or down. In this respect, throughout the years, a number of innovations have been developed relating to trailers that carry other vehicles, wherein the interconnection between the trailer and the pulling vehicle is maintained even as the trailer is tilted up or down, and the following U.S. patents are representative of some of those innovations: U.S. Pat. Nos. 2,817,537, 3,944,259, 4,564,209, 6,003,892, and 6,575,488.

More specifically, U.S. Pat. No. 2,817,537 discloses a boat trailer in which specially designed articulated portions of the trailer itself are rotated or translated with respect to each other in the trailer as the trailer is either tilted up or down. It is noted, however, that there are many trailers currently in use that do not have such specially designed articulated portions. In this respect, it would be desirable if a device were provided that allowed the interconnection between a trailer and a pulling vehicle to be maintained even as the trailer is tilted up or down without requiring the trailer to have specially designed articulated portions allowing maintenance of such trailer-to-vehicle interconnection.

U.S. Pat. No. 3,944,259 a trailer jacking device in which the trailer has a specially designed trailer tongue frame, an adjustable pivotal strut, and a lockable wheel connected to the strut. It is noted, however, that there are many trailers currently in use that do not have such specially designed frames, struts, and lockable wheels. In this respect, it would be desirable if a device were provided that allowed the interconnection between a trailer and a pulling vehicle to be maintained even as the trailer is tilted up or down without requiring the trailer to have specially designed frames, struts, and lockable wheels allowing maintenance of such trailer-to-vehicle interconnection.

U.S. Pat. No. 4,564,209 discloses a trailer hitch assembly that has a complex arrangement of upper and lower horizontal rails and a carriage that provide for transverse movement of the carriage. Such transverse movement is not needed with a boat or other vehicle trailer. Therefore, it would be desirable to provide for the maintenance of an interconnection between a trailer and the pulling vehicle even as the trailer is tilted up or down while avoiding a complex arrangement of upper and lower horizontal rails and a carriage that provide for transverse movement of the carriage.

U.S. Pat. No. 6,003,892 discloses a boat trailer tongue lowering jack apparatus that requires one screw jack element connected to the pulling and another screw jack element connected to the trailer. Trailers that are currently in use do not have such a screw jack element. Therefore, it would be desirable if a connection between a trailer and a pulling vehicle do not require a specially designed screw jack element to be connected to a trailer.

U.S. Pat. No. 6,575,488 discloses a vertically adjustable trailer hitch which is bolted and secured to fixed vertical adjusted positions. There is no continuous movement of the adjustable trailer hitch between the trailer and the pulling vehicle. Therefore, this trailer hitch does not permit a conventional boat trailer to be tilted up or down while maintaining an interconnection between the trailer and the pulling vehicle.

Thus, while the foregoing body of prior art indicates it to be well known to use an interconnection between a trailer and a pulling vehicle that allows the trailer to be tilted up and down without breaking the interconnection, the prior art described above does not teach or suggest a trailer ball raising and lowering apparatus which has the following combination of desirable features: (1) provides that the interconnection between a trailer and a pulling vehicle is maintained as the trailer is tilted up or down without requiring the trailer to have specially designed articulated portions allowing maintenance of such trailer-to-vehicle interconnection; (2) provides that the interconnection between a trailer and a pulling vehicle is maintained as the trailer is tilted up or down without requiring the trailer to have specially designed frames, struts, and lockable wheels allowing maintenance of such trailer-to-vehicle interconnection; (3) provides for the maintenance of an interconnection between a trailer and the pulling vehicle as the trailer is tilted up or down while avoiding a complex arrangement of upper and lower horizontal rails and a carriage that provide for transverse movement of the carriage; and (4) provides a connection between a trailer and a pulling vehicle does not require a specially designed screw jack element to be connected to a trailer. The foregoing desired characteristics are provided by the unique trailer ball raising and lowering apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a trailer ball raising and lowering apparatus which includes vehicle attachment means, a first hitch-support unit connected to the vehicle attachment means, a raisable and lowerable second hitch-support unit, continuously movable first-to-second connector means connected between the first hitch-support unit and the raisable and lowerable second hitch-support unit, unit-to-unit lock means for locking the raisable and lowerable second hitch-support unit to the first hitch-support unit, and a hitch member connected to the raisable and lowerable second hitch-support unit. An important feature of the present invention is that the interconnection between a trailer-mounted ball connector and a hitch ball unit on the motor vehicle is not disconnected during raising and lowering of the respective ends of the trailer. Also, the continuously movable first-to-second connector means provide for continuous raising and lowering of the raisable and lowerable second hitch-support unit with respect to the first hitch-support unit, as a trailer, which is connected to the hitch member, is raised and lowered.

With a first embodiment of the invention, the vehicle attachment means include a horizontal vehicle attachment strut received in a complementary strut-reception bracket in the motor vehicle, the first hitch-support unit is a first hitch-support bracket is to the horizontal vehicle attachment strut, the raisable and lowerable second hitch-support unit is a raisable and lowerable second hitch-support bracket, the continuously movable first-to-second connector means are comprised of bracket-to-bracket interconnector arm members hingedly connected between the first hitch-support bracket and the raisable and lowerable second hitch-support bracket, the unit-to-unit lock means include a lock pin, first lock-pin-reception channels in the first hitch-support bracket, and second lock-pin-reception channels in the raisable and lowerable second hitch-support bracket. The hitch member includes a hitch ball unit which is connected to the raisable and lowerable second hitch-support bracket.

Each of the bracket-to-bracket interconnector arm members includes a first hinge-pin-bolt-reception channel for receiving a first hinge pin bolt, a second hinge-pin-bolt-reception channel for receiving a second hinge pin bolt, and an intermediate arm portion connected between the first hinge-pin-bolt-reception channel and the second hinge-pin-bolt-reception channel.

Preferably, the raisable and lowerable second hitch-support bracket is nested into the first hitch-support bracket when the raisable and lowerable second hitch-support bracket is locked onto the first hitch-support bracket.

Embodiments of the invention have significant utility in raising the front end of a trailer, such as a two-wheeled trailer, so that the rear end of the trailer is lowered. Lowering of the rear end of a trailer is often necessary or desirable to load a low clearance vehicle, such as a racing automobile, onto a trailer or to unload a low clearance vehicle off from a trailer.

With a second embodiment of the invention, the vehicle attachment means include a horizontal vehicle attachment strut received in a complementary strut-reception bracket in the motor vehicle, the first hitch-support unit is a first telescopic hitch-support bracket connected to the horizontal vehicle attachment strut, the raisable and lowerable second hitch-support unit is a raisable and lowerable second telescopic hitch-support bracket, the continuously movable first-to-second connector means include a telescopic fit between the first telescopic hitch-support bracket and the raisable and lowerable second telescopic hitch-support bracket, the unit-to-unit lock means include a first lock-pin-reception tab connected to the horizontal vehicle attachment strut, and a second lock-pin-reception tab is connected to the raisable and lowerable second telescopic hitch-support bracket.

The raisable and lowerable second telescopic hitch-support bracket can include an inner piston-like portion, an outer cylinder-like portion, and a first-hitch-support-bracket-reception space between the inner piston-like portion and the outer cylinder-like portion. The inner piston-like portion is received inside the first telescopic hitch-support bracket, and the outer cylinder-like portion is received outside the first telescopic hitch-support bracket.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer ball raising and lowering apparatus which has all of the advantages of the prior art and none of the disadvantages.

It is another object of the present invention to provide a new and improved trailer ball raising and lowering apparatus which may be easily and efficiently manufactured and marketed.

It is a further object of the present invention to provide a new and improved trailer ball raising and lowering apparatus which is of durable and reliable construction.

An even further object of the present invention is to provide a new and improved trailer ball raising and lowering apparatus which is susceptible of a low cost of manufacture with regard to both materials and labor, and which accordingly is then susceptible of low prices of sale to the consuming public, thereby making such trailer ball raising and lowering apparatus available to the buying public.

Still yet a further object of the present invention is to provide a new and improved trailer ball raising and lowering apparatus which provides that the interconnection between a trailer and a pulling vehicle is maintained as the trailer is tilted up or down without requiring the trailer to have specially designed articulated portions allowing maintenance of such trailer-to-vehicle interconnection.

Still another object of the present invention is to provide a new and improved trailer ball raising and lowering apparatus that provides that the interconnection between a trailer and a pulling vehicle is maintained as the trailer is tilted up or down without requiring the trailer to have specially designed frames, struts, and lockable wheels allowing maintenance of such trailer-to-vehicle interconnection.

Yet another object of the present invention is to provide a new and improved trailer ball raising and lowering apparatus which provides for the maintenance of an interconnection between a trailer and the pulling vehicle as the trailer is tilted up or down while avoiding a complex arrangement of upper and lower horizontal rails and a carriage that provide for transverse movement of the carriage.

Even another object of the present invention is to provide a new and improved trailer ball raising and lowering apparatus that provides a connection between a trailer and a pulling vehicle does not require a specially designed screw jack element to be connected to a trailer.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 6 is a side view of a second embodiment of the trailer ball raising and lowering apparatus of the invention, wherein the ball portion of the apparatus is in the lowermost position.

FIG. 7 is a side view of the embodiment of the invention shown in FIG. 6, wherein the ball portion of the apparatus is in a raised position.

DESCRIPTION OF THE PREFERRED EMBODIMENT

Figure 1:
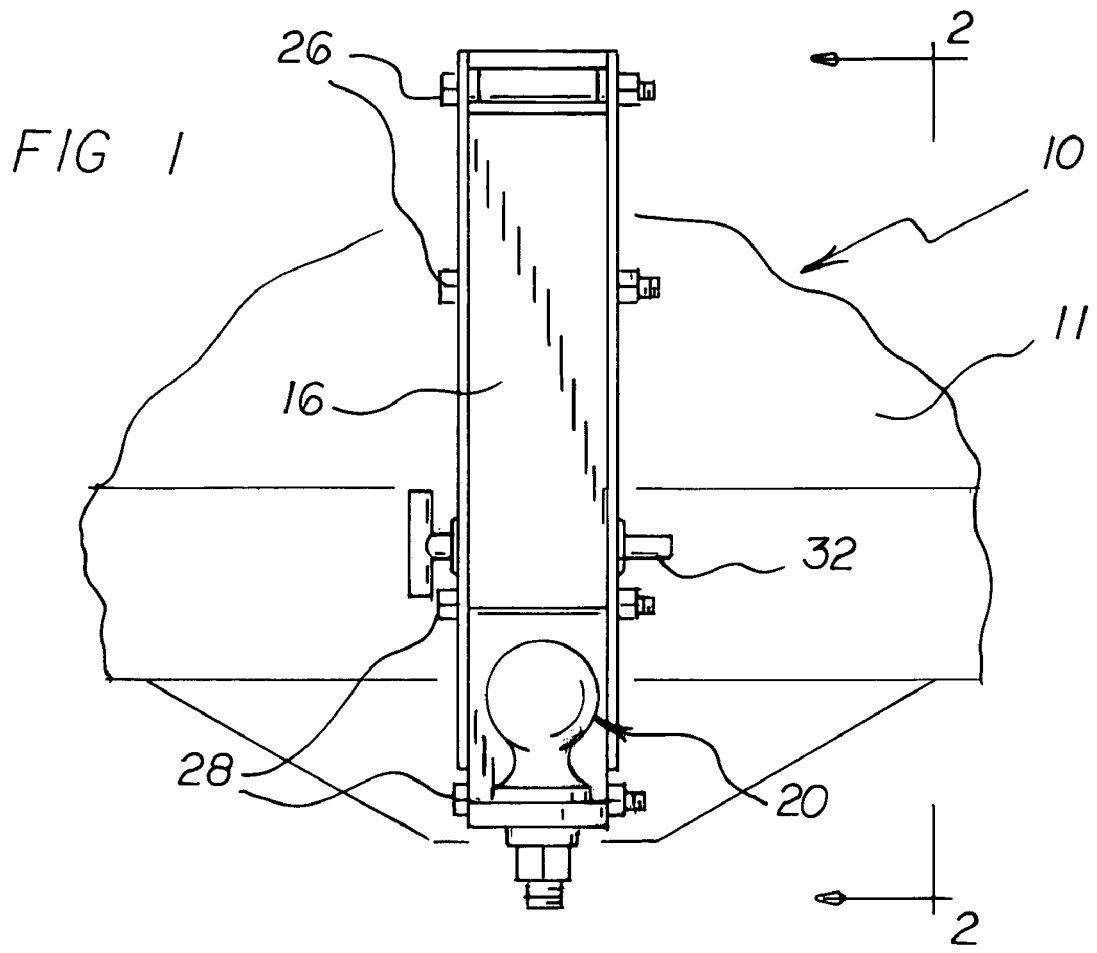
FIG. 1 is a front view showing a first embodiment of the trailer ball raising and lowering apparatus of the invention attached to the rear of a motor vehicle, wherein the ball portion of the apparatus is in a lowermost position.
Figure 2:
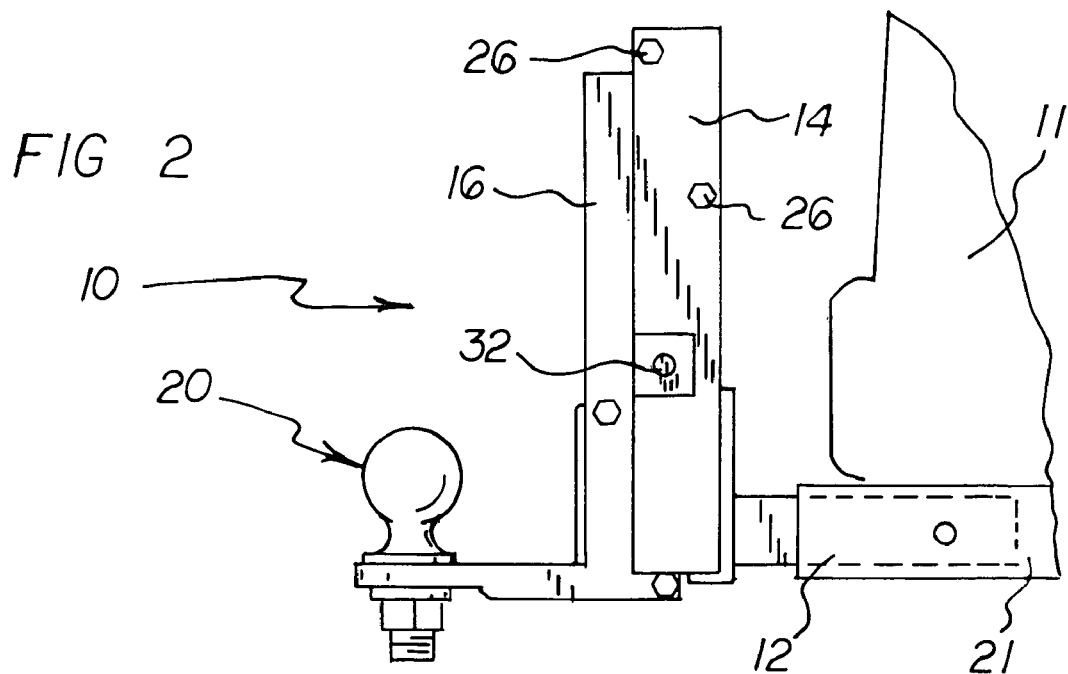
FIG. 2 is a side view of the embodiment of the trailer ball raising and lowering apparatus shown in FIG. 1 taken along line 2—2 of FIG. 1.
Figure 3:
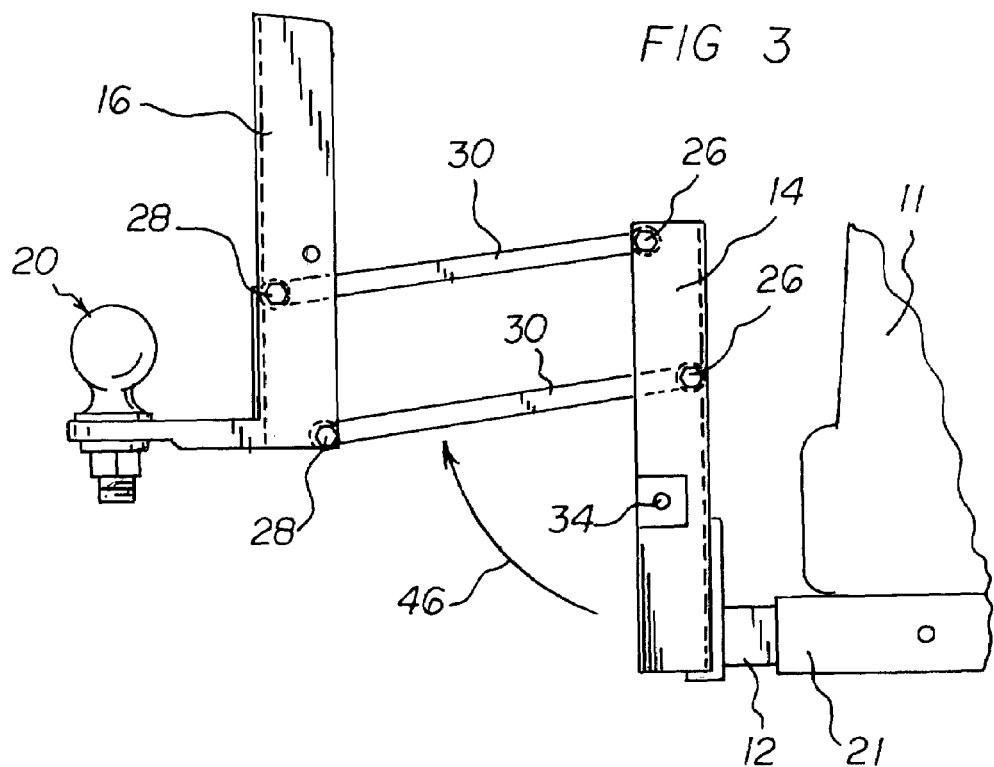
FIG. 3 is a side view of the embodiment of the trailer ball raising and lowering apparatus of FIG. 2 wherein the ball portion of the apparatus is in a raised position.
Figure 4:
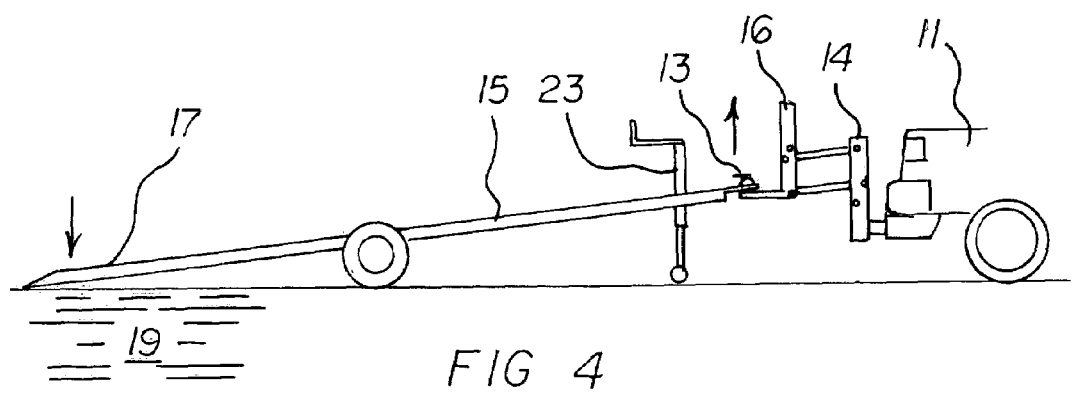
FIG. 4 is a side view of the embodiment of the invention shown in FIG. 3, wherein the ball portion of the apparatus is in a raised position and is connected to a trailer-mounted ball connector, whereby the front part of the trailer is raised, and whereby the rear end of the trailer is lowered to the street.
Figure 5:
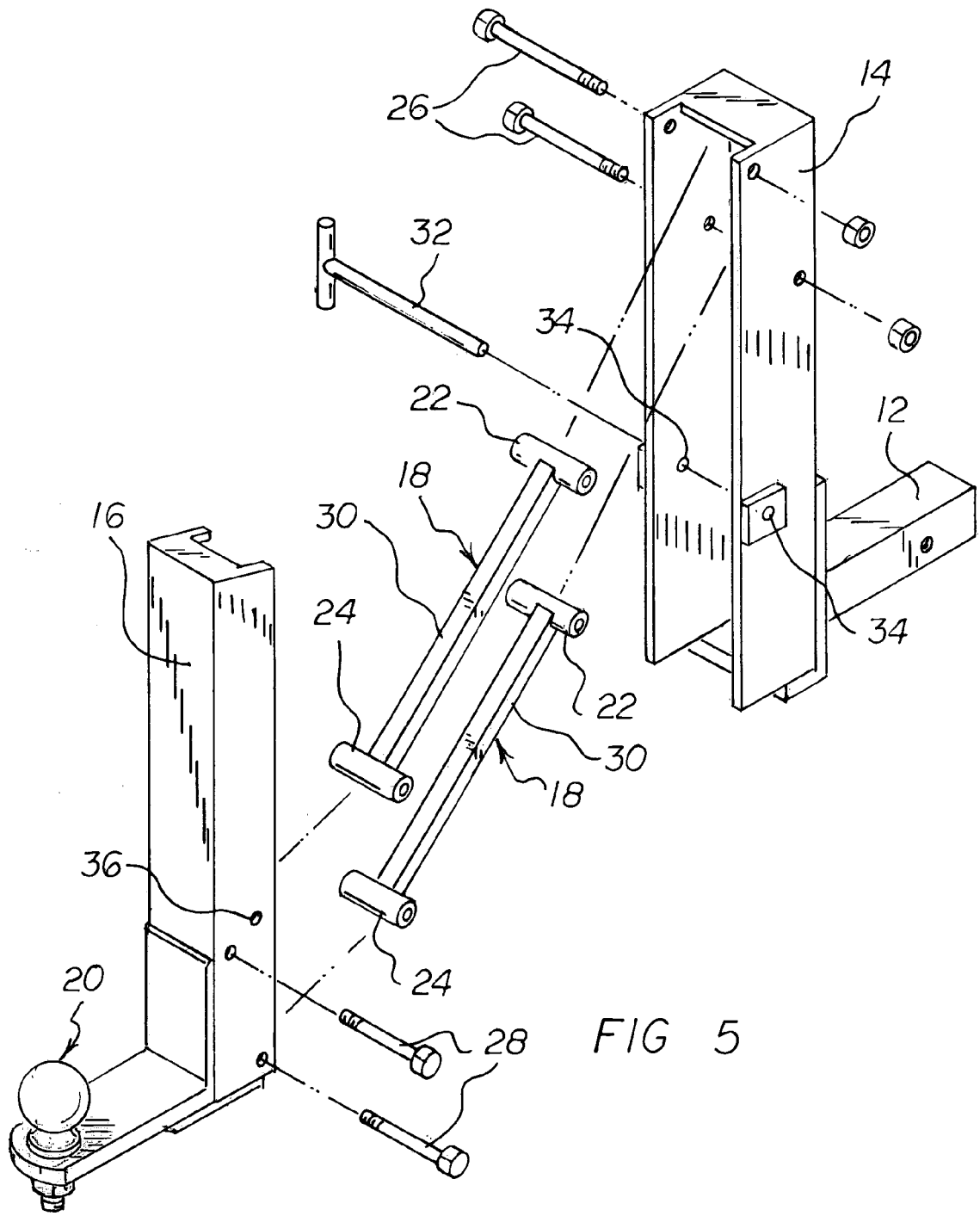
FIG. 5 is an exploded perspective view of the embodiment of the invention shown in FIGS. 1–4.

With reference to the drawings, a new and improved trailer ball raising and lowering apparatus embodying the principles and concepts of the present invention will be described.

Turning to FIGS. 1–5, there is shown a first embodiment of the trailer ball raising and lowering apparatus of the invention generally designated by reference numeral 10. In the first embodiment, the trailer ball raising and lowering apparatus 10 includes vehicle attachment means, a first hitch-support unit connected to the vehicle attachment means, a raisable and lowerable second hitch-support unit, continuously movable first-to-second connector means connected between the first hitch-support unit and the raisable and lowerable second hitch-support unit, unit-to-unit lock means for locking the raisable and lowerable second hitch-support unit to the first hitch-support unit, and a hitch member connected to the raisable and lowerable second hitch-support unit. An important feature of the present invention is that the interconnection between a trailer-mounted ball connector 13 and a hitch ball unit 20 on the motor vehicle 11 is not disconnected during raising and lowering of the respective ends of the trailer 15.

As shown in the first embodiment of the invention, in FIGS. 1–5, the vehicle attachment means include a horizontal vehicle attachment strut 12 received in a complementary strut-reception bracket 21 in the motor vehicle 11. The first hitch-support unit is a first hitch-support bracket 14 which is connected to the horizontal vehicle attachment strut 12. The raisable and lowerable second hitch-support unit is a raisable and lowerable second hitch-support bracket 16. The continuously movable first-to-second connector means are comprised of bracket-to-bracket interconnector arm members 18 hingedly connected between the first hitch-support bracket 14 and the raisable and lowerable second hitch-support bracket 16. The unit-to-unit lock means include a lock pin 32, first lock-pin-reception channels 34 in the first hitch-support bracket 14, and second lock-pin-reception channels 36 in the raisable and lowerable second hitch-support bracket 16. The hitch member includes a hitch ball unit 20 connected to the raisable and lowerable second hitch-support bracket 16.

Each of the bracket-to-bracket interconnector arm members 18 includes a first hinge-pin-bolt-reception channel 22 for receiving a first hinge pin bolt 26, a second hinge-pin-bolt-reception channel 24 for receiving a second hinge pin bolt 28, and an intermediate arm portion 30 connected between the first hinge-pin-bolt-reception channel 22 and the second hinge-pin-bolt-reception channel 24.

Preferably, the raisable and lowerable second hitch-support bracket 16 is nested into the first hitch-support bracket 14 when the raisable and lowerable second hitch-support bracket 16 is locked onto the first hitch-support bracket 14.

Embodiments of the invention have significant utility in raising the front end of a trailer, such as a two-wheeled trailer, so that the rear end of the trailer is lowered. Lowering of the rear end of a trailer is often necessary or desirable to load a low clearance vehicle, such as a racing automobile, onto a trailer or to unload a low clearance vehicle off from a trailer.

To use the first embodiment 10 of the invention, the lock pin 32 is removed from the first lock-pin-reception channels 34 and the second lock-pin-reception channels 36. As a result, the raisable and lowerable second hitch-support bracket 16 can move freely with respect to the first hitch-support bracket 14.

The manually operated trailer jack 23 is operated to raise the front end of the trailer 15. Alternatively, a motorized trailer jack could also be employed. As the front end of the trailer 15 is raised, the rear end of the trailer 15 is lowered. As the front end of the trailer is raised, the raisable and lowerable second hitch-support bracket 16 swings up and away from the first hitch-support bracket 14, as shown by directional arrow 46 in FIG. 3. More specifically, the first hinge-pin-bolt-reception channels 22 rotate around the first hinge pin bolts 26, and the second hinge-pin-bolt-reception channels 24 rotate around the second hinge pin bolts 28.

An important feature of the present invention is that the interconnection between the trailer-mounted ball connector 13 and the hitch ball unit 20 on the motor vehicle 11 is not disconnected during raising and lowering of the respective ends of the trailer 15.

After a motor vehicle or other object has been loaded onto or unloaded from the trailer 15, the trailer 15 can be reoriented to the horizontal orientation. As this occurs, the raisable and lowerable second hitch-support bracket 16 moves downward and into the first hitch-support bracket 14. Then, the lock pin 32 is inserted again through the first lock-pin-reception channels 34 and the second lock-pin-reception channels 36, which are in registration with each other, to lock the raisable and lowerable second hitch-support bracket 16 to the first hitch-support bracket 14.

As shown in the second embodiment of the invention 50, in FIGS. 6–9, the vehicle attachment means include a horizontal vehicle attachment strut 12 received in a complementary strut-reception bracket 21 in the motor vehicle 11. The first hitch-support unit is a first telescopic hitch-support bracket 38 connected to the horizontal vehicle attachment strut 12. The raisable and lowerable second hitch-support unit is a raisable and lowerable second telescopic hitch-support bracket 40. The continuously movable first-to-second connector means include a telescopic fit between the first telescopic hitch-support bracket 38 and the raisable and lowerable second telescopic hitch-support bracket 40. The unit-to-unit lock means include a first lock-pin-reception tab 42 which is connected to the horizontal vehicle attachment strut 12, and a second lock-pin-reception tab 44 is connected to the raisable and lowerable second telescopic hitch-support bracket 40.

The raisable and lowerable second telescopic hitch-support bracket 40 includes an inner piston-like portion 48, an outer cylinder-like portion 52, and a first-hitch-support-bracket-reception space 54 between the inner piston-like portion 48 and the outer cylinder-like portion 52. The inner piston-like portion 48 is received inside the first telescopic hitch-support bracket 38, and the outer cylinder-like portion 52 is received outside the first telescopic hitch-support bracket 38.

To use the second embodiment of the invention 50, the raisable and lowerable second telescopic hitch-support bracket 40 is at first in a fully lowered position with respect to the first telescopic hitch-support bracket 38 and is locked thereto by the lock pin 32, as shown in FIG. 6.

Figure 8:
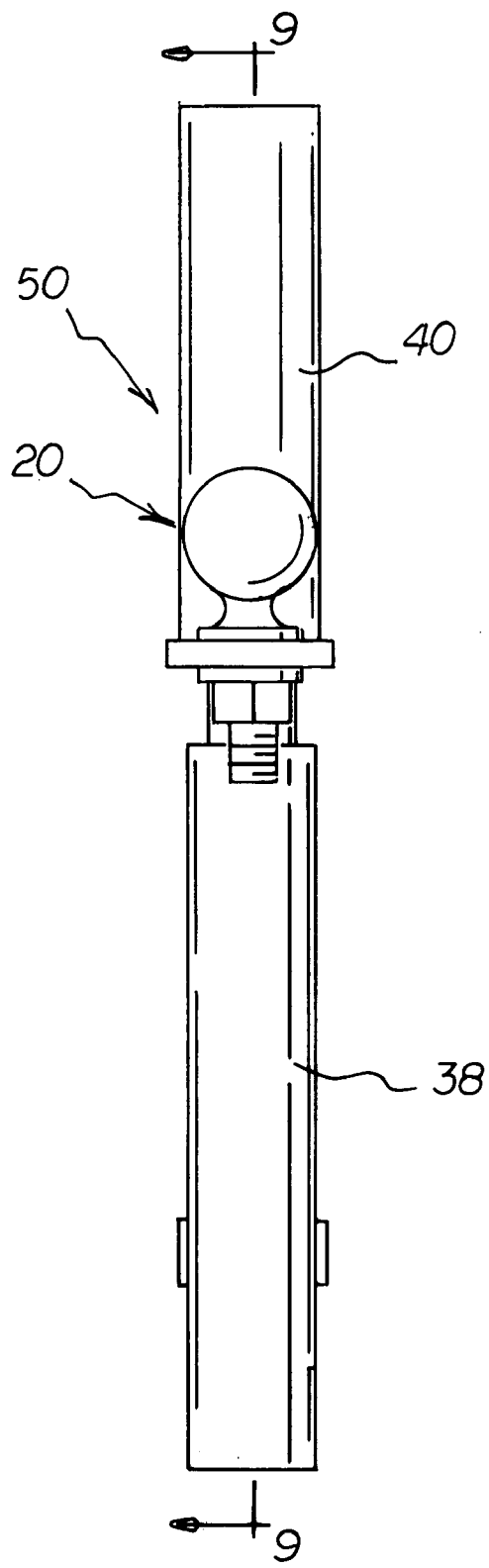
FIG. 8 is an enlarged from view of the embodiment of the invention shown in FIG. 7, taken along line 8—8 thereof.
Figure 9:
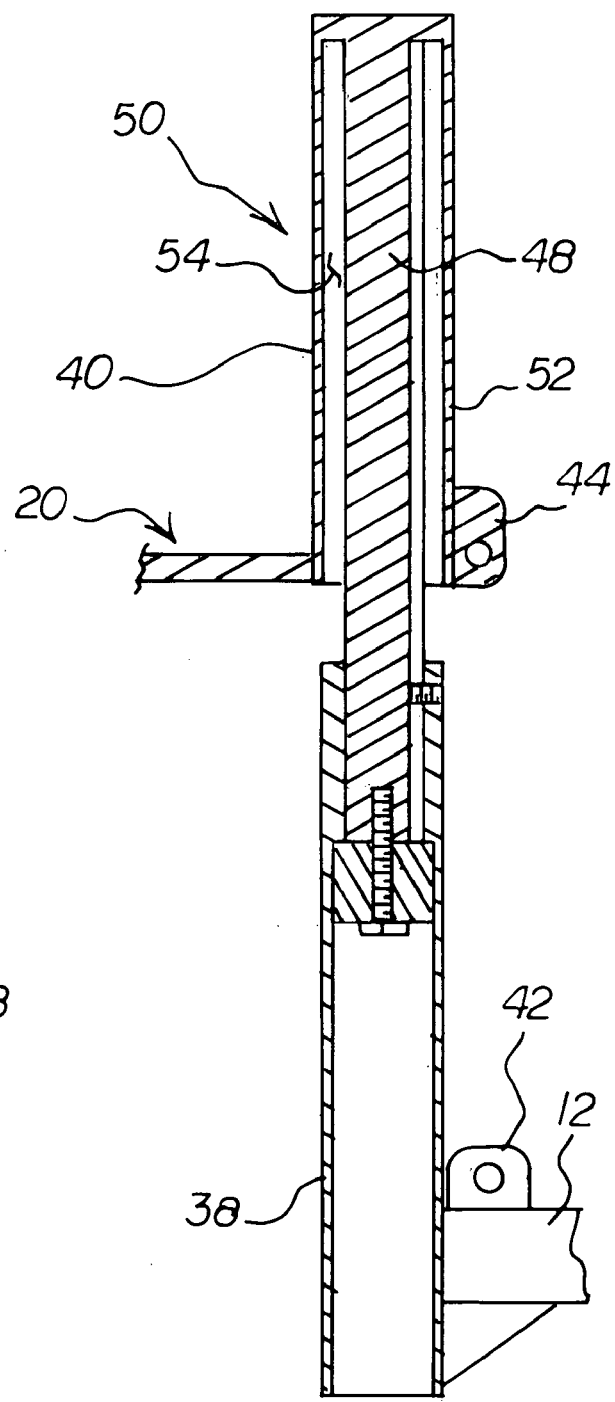
FIG. 9 is a cross-sectional view of the embodiment of the invention shown in FIG. 8, taken along line 9—9 thereof.

To raise the raisable and lowerable second telescopic hitch-support bracket 40 with respect to the first telescopic hitch-support bracket 38, the lock pin 32 is removed from the first lock-pin-reception tab 42 and the second lock-pin-reception tab 44. Then, with the trailer-mounted ball connector 13 still connected to the hitch ball unit 20, the front end of the trailer 15 is jacked up. When this is done, the front end of the trailer 15 is raised, and the rear end of the trailer 15 is lowered to the street 19. Also, as the front end of the trailer 15 is raised, the raisable and lowerable second telescopic hitch-support bracket 40 is raised vertically with respect to the first telescopic hitch-support bracket 38, as shown in FIGS. 7–9.

When the front end of the trailer 15 is lowered and the rear end of the trailer 15 is raised, the inner piston-like portion 48 moves deeper into the first telescopic hitch-support bracket 38, and the outer cylinder-like portion 52 moves deeper around the first telescopic hitch-support bracket 38. This is all accomplished with the trailer-mounted ball connector 13 still is connected to the hitch ball unit 20.

When the trailer 15 is in a horizontal orientation, the second lock-pin-reception tab 44 is in registration with the first lock-pin-reception tab 42, and the lock pin 32 is replaced to keep the raisable and lowerable second telescopic hitch-support bracket 40 locked to the first telescopic hitch-support bracket 38.

If desired, the second embodiment of the invention can also include a jack assembly (not shown) incorporated therein. If such were the case, then the trailer ball raising and lowering apparatus 10 which incorporates a jack assembly can be used with a trailer 15 that does not include a trailer jack. Trailers that include an integrated trailer jack, whether manually operated or motor powered, are considerably more expensive than a trailer which does not includes a trailer jack. Therefore, if a trailer ball raising and lowering apparatus 10 with an incorporated trailer jack were employed, a considerable savings in money in purchasing a trailer can be realized.

The components of the trailer ball raising and lowering apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved trailer ball raising and lowering apparatus that is low in cost, relatively simple in design and operation, and which may advantageously be used to provide that the interconnection between a trailer and a pulling vehicle is maintained as the trailer is tilted up or down without requiring the trailer to have specially designed articulated portions allowing maintenance of such trailer-to-vehicle interconnection. With the invention, a trailer ball raising and lowering apparatus provides that the interconnection between a trailer and a pulling vehicle is maintained as the trailer is tilted up or down without requiring the trailer to have specially designed frames, struts, and lockable wheels allowing maintenance of such trailer-to-vehicle interconnection. With the invention, a trailer ball raising and lowering apparatus provides for the maintenance of an interconnection between a trailer and the pulling vehicle as the trailer is tilted up or down while avoiding a complex arrangement of upper and lower horizontal rails and a carriage that provide for transverse movement of the carriage. With the invention, a trailer ball raising and lowering apparatus provides a connection between a trailer and a pulling vehicle does not require a specially designed screw jack element to be connected to a trailer.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A trailer ball raising and lowering apparatus, comprising:

vehicle attachment means, a first hitch-support unit connected to said vehicle attachment means, a raisable and lowerable second hitch-support unit, continuously movable first-to-second connector means connected between said first hitch-support unit and said raisable and lowerable second hitch-support unit, unit-to-unit lock means for locking said raisable and lowerable second hitch-support unit to said first hitch-support unit, and a hitch member connected to said raisable and lowerable second hitch-support unit, wherein said continuously movable first-to-second connector means provide for continuous raising and lowering of said raisable and lowerable second hitch-support unit with respect to said first hitch-support unit, and wherein:

said vehicle attachment means is a horizontal vehicle attachment strut received in a complementary strut-reception bracket in the motor vehicle, said first hitch-support unit is a first hitch-support bracket connected to said horizontal vehicle attachment strut, said raisable and lowerable second hitch-support unit is a raisable and lowerable second hitch-support bracket, said continuously movable first-to-second connector means are comprised of bracket-to-bracket interconnector arm members hingedly connected between said first hitch-support bracket and said raisable and lowerable second hitch-support bracket, said unit-to-unit lock means include a lock pin, first lock-pin-reception channels in said first hitch-support bracket, and second lock-pin-reception channels in said raisable and lowerable second hitch-support bracket, and said hitch member includes a hitch ball unit connected to said raisable and lowerable second hitch-support bracket.

2. The apparatus of claim 1 wherein each of said bracket-to-bracket interconnector arm members includes:

a first hinge-pin-bolt-reception channel for receiving a first hinge pin bolt, a second hinge-pin-bolt-reception channel for receiving a second hinge pin bolt, and an intermediate arm portion connected between said first hinge-pin-bolt-reception channel and said second hinge-pin-bolt-reception channel.

3. The apparatus of claim 1 wherein said raisable and lowerable second hitch-support bracket is nested into said first hitch-support bracket when said raisable and lowerable second hitch-support bracket is locked onto said first hitch-support bracket.

4. A trailer ball raising and lowering apparatus, comprising:

vehicle attachment means, a first hitch-support unit connected to said vehicle attachment means, a raisable and lowerable second hitch-support unit, continuously movable first-to-second connector means connected between said first hitch-support unit and said raisable and lowerable second hitch-support unit, unit-to-unit lock means for locking said raisable and lowerable second hitch-support unit to said first hitch-support unit, and a hitch member connected to said raisable and lowerable second hitch-support unit, wherein said continuously movable first-to-second connector means provide for continuous raising and lowering of said raisable and lowerable second hitch-support unit with respect to said first hitch-support unit, wherein:

said vehicle attachment means is a horizontal vehicle attachment strut received in a complementary strut-reception bracket in the motor vehicle, said first hitch-support unit is a first telescopic hitch-support bracket connected to said horizontal vehicle attachment strut, said raisable and lowerable second hitch-support unit is a raisable and lowerable second telescopic hitch-support bracket, said continuously movable first-to-second connector means include a telescopic fit between said first telescopic hitch-support bracket and said raisable and lowerable second telescopic hitch-support bracket, and said unit-to-unit lock means include a first lock-pin-reception tab connected to said horizontal vehicle attachment strut and a second lock-pin-reception tab connected to said raisable and lowerable second telescopic hitch-support bracket, and wherein:

said raisable and lowerable second telescopic hitch-support bracket includes an inner piston-like portion, an outer cylinder-like portion, and a first-hitch-support-bracket-reception space between said inner piston-like portion and said outer cylinder-like portion, and said inner piston-like portion is received inside said first telescopic hitch-support bracket, and said outer cylinder-like portion is received outside said first telescopic hitch-support bracket.

* * * * *